No. 677,443. Patented July 2, 1901.
G. EASTMAN.
PHOTOGRAPHIC ROLL HOLDER.
(Application filed Aug. 23, 1897.)
(No Model.) 3 Sheets—Sheet 1.
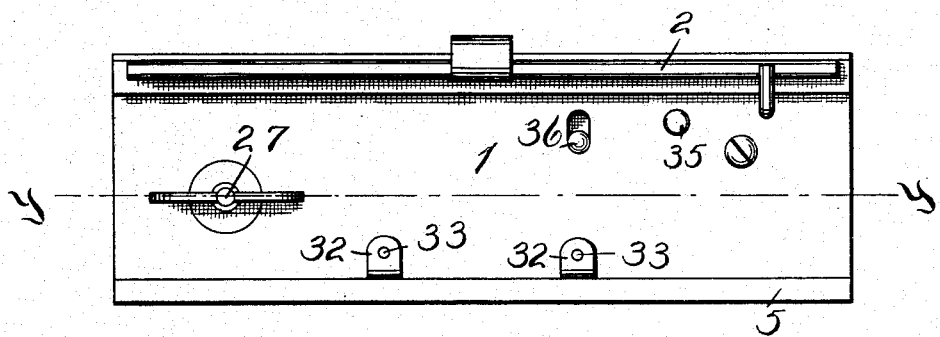
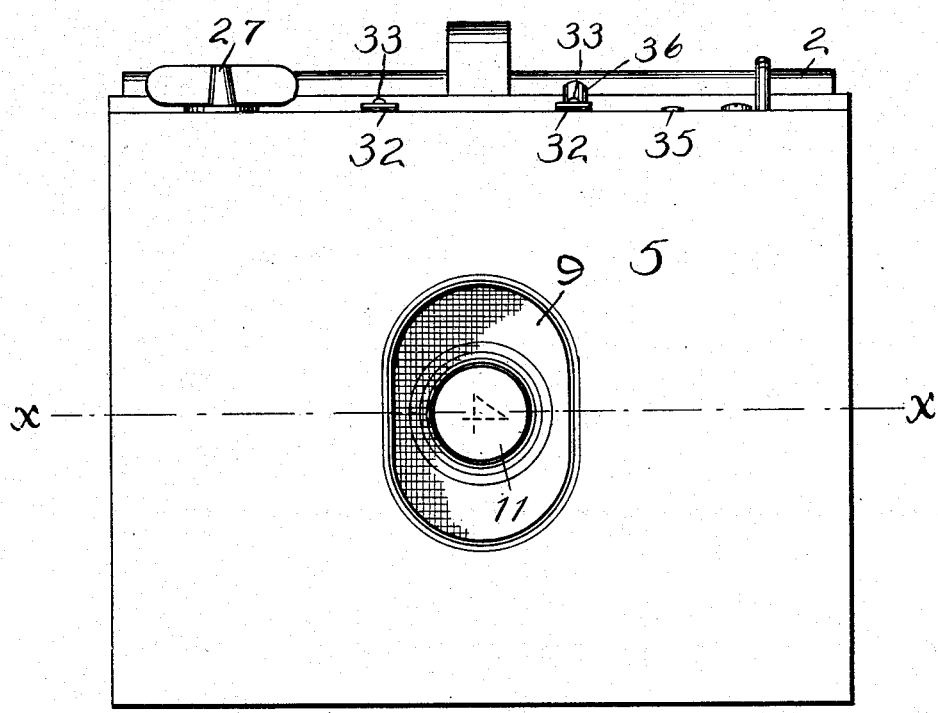
Witnesses.
G. Willard Rich.
Grace A. Roda.
Inventor.
George Eastman
Frederick F. Church
his Attorney.

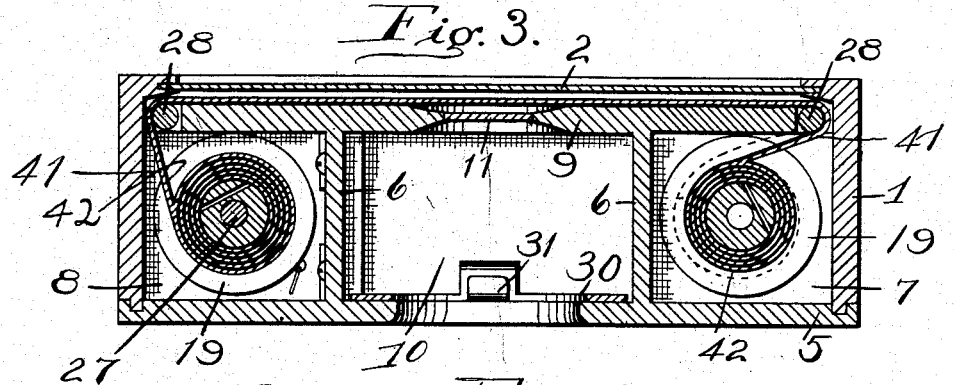
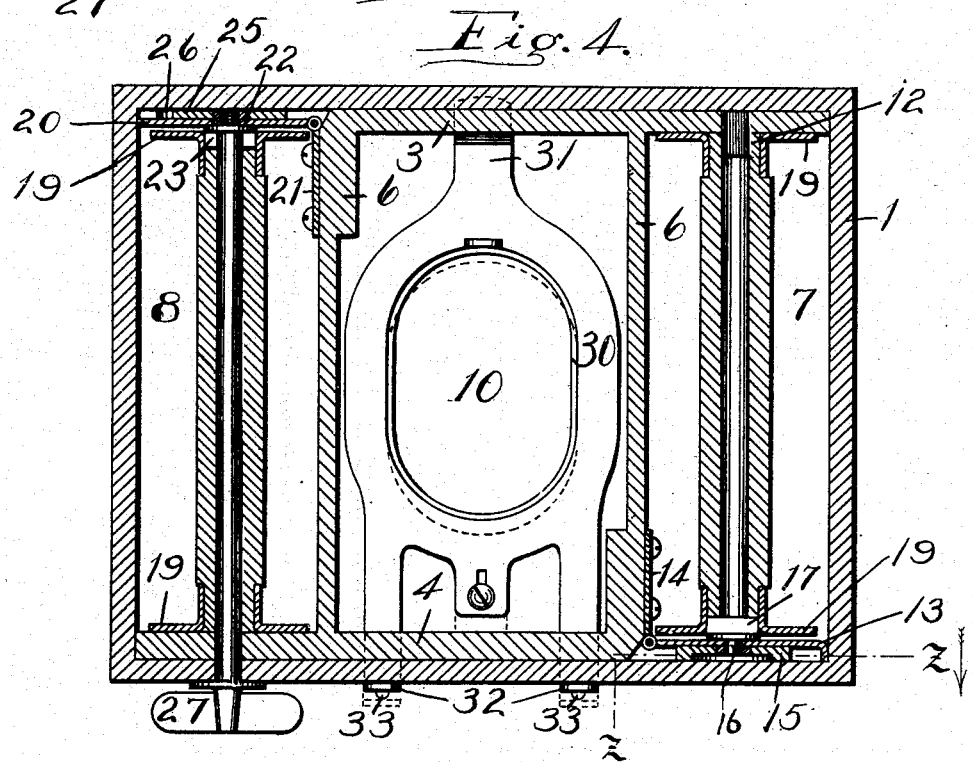
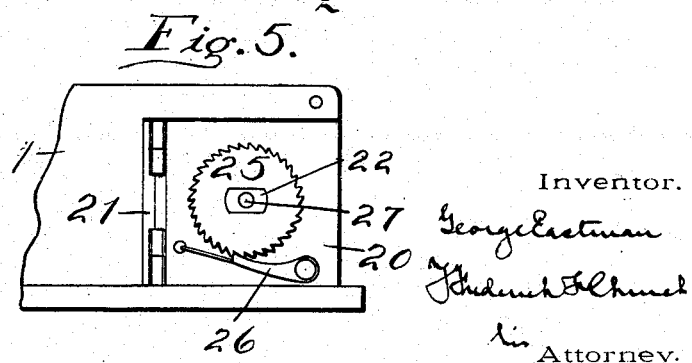

No. 677,443. Patented July 2, 1901.
G. EASTMAN.
PHOTOGRAPHIC ROLL HOLDER.
(Application filed Aug. 23, 1897.)
(No Model.) 3 Sheets—Sheet 3.
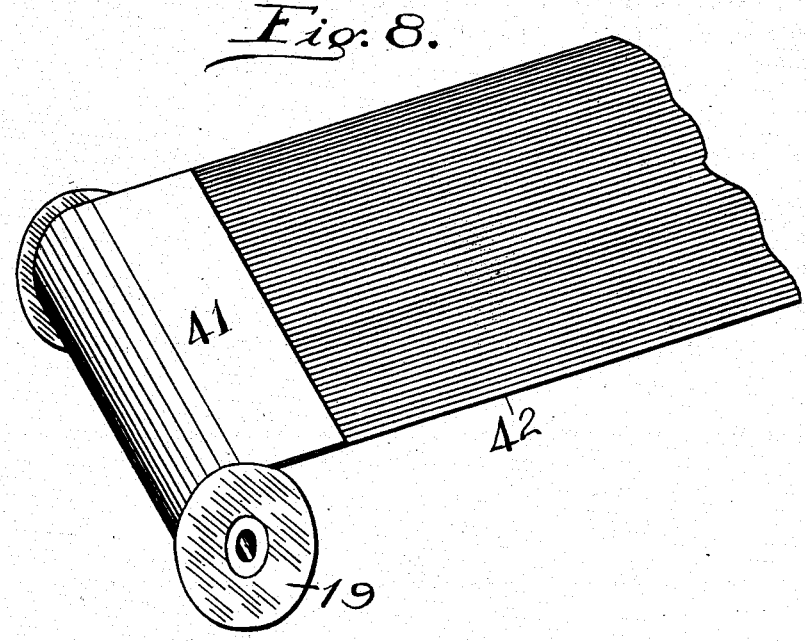
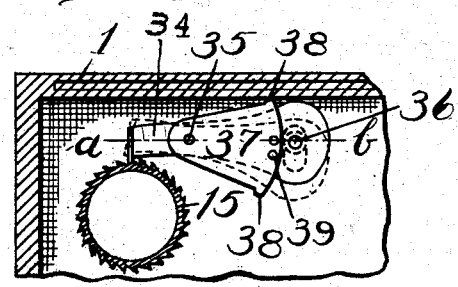
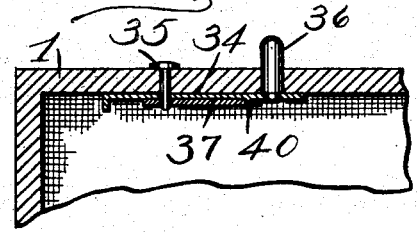
Witnesses.
G. Willard Rich.
Grace A. Roda.
Inventor.
George Eastman
by Frederick F. Church
his Attorney.

UNITED STATES PATENT OFFICE.

GEORGE EASTMAN, OF ROCHESTER, NEW YORK, ASSIGNOR TO THE EASTMAN KODAK COMPANY, OF SAME PLACE.

PHOTOGRAPHIC-ROLL HOLDER.

SPECIFICATION forming part of Letters Patent No. 677,443, dated July 2, 1901.

Application filed August 23, 1897. Serial No. 649,147. (No model.)

*To all whom it may concern:*

Be it known that I, GEORGE EASTMAN, of Rochester, in the county of Monroe and State of New York, have invented certain new and useful Improvements in Photographic-Roll Holders; and I do hereby declare the following to be a full, clear, and exact description of the same, reference being had to the accompanying drawings, forming a part of this specification, and to the reference-numerals marked thereon.

My invention has for its object to provide an improved roll-holder for use in connection with photographic cameras for holding rolls or spools of film, known as "cartridge-rolls"—that is to say, those adapted to be placed within a camera or roll-holder in daylight—and consisting of a strip of flexible sensitive film, preferably transparent, and a strip of black paper or similar material wound with the film upon the spool or roll and adapted to cover or protect the back of the film while it is in the camera, the longer ends of the black paper, which are wrapped around the spool or complete package, covering the film and protecting it from light before and after exposure. In the use of spools or rolls of film of this character it has been customary to locate the spools in the camera or holder forward of the back of the exposing chamber or aperture so that the face of the film would be in contact with the edges of said aperture while being wound from one spool to the other, as shown, for instance, in United States Letters Patent No. 579,949, to F. A. Brownell, dated April 6, 1897. When the film is used in this manner, there is little or no difficulty in properly rolling and unrolling the spools, because the film itself is in contact with the frame or surface, tending to retard it, and the film is drawn directly upon the winding spool or reel and kept flat against the edge of the exposing-aperture, and it matters very little whether or not the black covering-paper moves at precisely the same speed as the film—that is, the paper may be and usually is loose at the back of the film or between one spool and the other. While this form of apparatus will work well, great difficulty has been experienced in using the cartridge-rolls in holders in which the table or support for holding the film during exposure is forward—*i. e.*, toward the lens—of the spools themselves, because in using the film-cartridges of the ordinary construction and in the usual manner, the black paper is upon the exterior of both the winding and supply spools and, in this form of holder, is alone in contact with the surface of the table or support and draws over the edges thereof, said paper taking both the drawing and retarding strains and leaving the film loose and not strained or held taut upon the paper and support, and portions thereof are liable to be out of focus. The objection is of course accentuated as the film and paper are wound upon the receiving-spool, and the result is that the film and paper do not wind evenly on said spool and one or both are liable to become wrinkled and creased, causing a variation in the movement of the tension on the edges of both the film and paper at the ends of the spool, and when the tension is not equal at both ends of the spool the film and paper will wind on the receiving roller or reel crooked, and having once started in this way in a very short time it will overlap the flange of the spool or catch in the front frame of the holder, or both, and become torn at the edges. Furthermore, the film and paper being of different materials are liable to variations, due to atmospheric and other conditions, so that it is unsafe to rely upon their proper operation in the roll-holder when wound and drawn in the manner indicated.

I have found, and only after considerable experimenting, that if one of the ordinary film rolls or cartridges with the paper wound on the outside of the film is used as the supply-spool and the film and paper after passing over the support are wound on the receiving-spool with the film side outward or at the periphery the objections heretofore pointed out will be obviated and the drawing strain coming upon the film itself instead of on the paper will cause the film and paper to be wound smoothly upon the receiving roller or spool, and by having the longer end of the black paper upon the supply-spool of increased length, so as to wrap several times around the film when on the winding spool or roller, it effectually covers the roll or spool of exposed film, and the latter may be removed from the holder in daylight in the same manner that spools or cartridges are ordinarily used in the cameras of the class of which the one described in the before-mentioned Brownell patent is a type.

My present invention therefore consists in a roll-holder adapted and arranged to perform the functions mentioned and also consists in certain improvements in construction and combinations of parts, all as will be hereinafter fully described, and the novel features pointed out particularly in the claims at the end of this specification.

In the drawings, Figure 1 is a top plan view of a holder constructed in accordance with my invention; Fig. 2, a rear elevation of the same; Fig. 3, a longitudinal sectional view on the line $x$ $x$ of Fig. 2; Fig. 4, a horizontal sectional view on the line $y$ $y$ of Fig. 1; Fig. 5, a detail view of one end of the holding-frame removed from the casing; Fig. 6, a sectional view on the line $z$ $z$ of Fig. 4; Fig. 7, a sectional view on the line $a$ $b$ of Fig. 6; Fig. 8, a perspective view of the receiving spool or roller and the film and paper.

Similar reference-numerals indicate similar parts.

1 indicates the frame or casing of the holder, having at the front the usual opening adapted to be closed by a slide or door 2, said casing being arranged and adapted by suitable flanges, rabbets, &c., to be applied to the back of a camera after the manner of an ordinary plate or roll holder. Within the casing is arranged a frame embodying the bottom board 3 and the top board 4, both being connected to the back or cover board 5, to which latter are also connected partitions 6, as in Figs. 3 and 4, forming at each end of the frame chambers or receptacles 7 and 8, in the former of which is located the supply-spool and in the latter the receiving-spool or winding-reel.

9 indicates the film platen or support, attached to and forming part of the holding-frame and arranged forward of the chambers or recesses for the spools, this support coöperating with the partitions 6, so as to close the inner sides of the spool receptacles or chambers, and forming a third chamber 10, which is open at the back of the holder to permit the operator to view the indications on the back of the black or covering paper of the spool through an aperture in the support 9, preferably covered by a piece of ruby glass 11. Small rollers 28 are arranged at the ends of the support 9, over which the film and paper pass, as usual in devices of this description. Located at one end of the chamber 7, containing the supply-spool, is a stationary spool-centering stud 12, and at the other end of said chamber is a plate 13, hinged at its rear edge to a bracket 14 and having mounted upon it a ratchet-wheel 15, connected to a stud 16, passing loosely through the plate 13 and having upon its inner end an angular spool centering and holding head 17, adapted to engage a suitable irregularly-shaped aperture in one end of the spool. The spools are, as usual, composed of a longitudinally-perforated and slotted spindle having flanges or heads 19 at the ends for protecting the edges of the film.

At one end of the chamber 8, containing the winding spool or reel, is a plate 20, hinged to a bracket 21, corresponding to the bracket 14, said plate constituting the end of the chamber and having upon it a rotatable stud 22, the inner end of which is provided with an irregularly-shaped head 23, adapted to enter one end of the winding-spool, said stud having a threaded aperture and upon its outer end an irregular-shaped portion passing through and securely attached to a ratchet-wheel 25, with which wheel coöperates a spring-operated pawl 26 for preventing backward rotation of the ratchet-wheel and permitting its rotation only in a direction away from the end of the support 9. The winding-spool is centered for rotation by a spindle or arbor 27, passing through an aperture in the casing, through a similar one in the end of the frame, and longitudinally through the spool and having a threaded end for engaging with a correspondingly-threaded aperture in the stud 22.

The frame is held within the casing by a suitable locking or bolt device, in the present embodiment consisting of a sliding plate 30, extending around the aperture in the rear of the frame, having the downwardly-projecting end 31 and the angular perforated lugs 32, the end 31 being adapted to enter a suitable recess in the lower edge of the casing and the lugs 32 coöperating with pins or studs 33 upon the exterior of the casing, as shown in Figs. 1 and 2.

Arranged upon one side of the casing and in proximity to the detent or ratchet wheel 15 on the supply-spool is a detent or lever 34, pivoted upon a stud 35 and having one end adapted to engage with the detent-wheel 15, as shown in Fig. 6. The other end of the lever 34 is provided with a stud 36, projecting through a suitable slot in the casing, the lever being wider than the slot to prevent the entrance of light. 37 indicates a stop-plate, preferably of spring metal, held upon the pin 35 at one end and having on opposite sides of the rear end of the catch 34 small lugs or spurs 38, entering the edge of the casing, said plate having apertures 39, with which coöperates a projection 40 on the lever 36, serving to hold the lever in engagement with or disengaged from the detent-wheel 15, as shown in full and dotted lines in Fig. 6. This detent or lever 34 serves as a means for holding the supply-spool, so that by winding forward the film the latter may be stretched tightly over the support.

In using the device just described the operator places within the chamber 7 an ordinary cartridge-spool containing a strip of film (indicated generally by 41) with which is wound a strip of black paper 42, the film and paper being wound together, with the paper on the outside, as shown particularly in Fig. 3. The free end of the paper, which, as usual, covers the spool with several convolutions, is drawn over the table or support and its end secured to the receiving spool or reel mounted at one end upon the stud 22, these operations being performed in daylight. The frame containing the spools is then placed within the casing, and the winding-arbor 27 is passed through the casing and spool and screwed into the stud 22. Then the operator winds paper and film forward until the usual indication or number placed upon the back of the paper is visible through the glass-covered aperture in the back of the support. He then moves the detent 34 to the position shown in full lines in Fig. 6, holding the detent-wheel on the supply-spool, and turns the winding-arbor a partial rotation, thereby drawing the film tightly down on the support, in which position it is held while the exposure is made in the usual manner. When it is desired to wind forward another exposure of film, the detent-lever 34 is moved to the position in dotted lines in Fig. 6, releasing the supply-spool and permitting another exposure of film to be wound over the support and further exposures to be made in the manner described.

By reason of the fact that the film is drawn from the inside of the supply-spool to the outside of the receiving spool it will be kept taut and substantially flat upon the table, and it is immaterial that the slack of the paper between the roller 28 and the surface of the supply-spool, as shown in dotted lines in Fig. 3, is within the supply-spool chamber 7, as this does not in any way interfere with the rolling or the maintenance of the film in a flat position on the support. When the last exposure has been made and the end of the film has passed into the receiving-roller, the operator turns the winding arbor or spindle until the last end of the covering-paper 42 is wound several times around the film, thereby inclosing it and permitting its removal in daylight. When the winding spool or roller is removed from the holder by removing the spindle and swinging out the hinged plate 20, care should be taken to prevent the accidental unwinding of the film, as it is more or less elastic, and is then wound in the reverse direction from what it was on the supply-spool.

I claim as my invention—

1. In a photographic-roll holder, the combination with the casing having the front opening, of the film-support having the aperture therein, the receiving and supply spool chambers in rear of the support, and near opposite ends thereof, spool centering and holding devices in the chambers, a ratchet-wheel connected to the centering device in the winding-spool chamber, and a pawl preventing its rotation toward the edge of the support, substantially as described.

2. In a photographic-roll holder, the combination with the casing having the front opening, of the film-support having the observation-aperture therein, the winding and supply spool chambers in rear of the support, and spool-centering devices in the spool-chambers.

3. In a photographic-roll holder, the combination with the casing having the front opening, of the film-support having the observation-opening therein, the spool-chambers at the rear of the film-support, film-spools mounted in the chambers, each containing sensitized film and opaque paper wound thereon, the film on the supply-spool being wound inside the paper, and that on the winding-spool being wound outside the paper and the paper being in contact with the support as it passes from one spool to the other, ratchet devices for preventing backward rotation of the winding-spool, and a manually-operated detent for arresting the supply-spool, substantially as described.

4. In a photographic-roll holder, the combination with the casing, the removable frame embodying the film-support, which latter is provided with the observation-aperture, the cover 5 having the aperture coinciding with that in the film-support, and the partitions 6 forming spool-chambers, the ratchet-wheel in the winding-spool chamber, and the pawl coöperating therewith, and the removable spool-operating spindle coöperating with the ratchet-wheel, substantially as described.

5. In a photographic-roll holder, the combination with the casing having the opening, of the removable frame having the film-support, the supply and winding spool chambers in the frame in rear of the support, the hinged plate at the end of the winding-spool chamber, the ratchet-wheel and pawl on the plate, the spool-engaging stud on the wheel, and the removable spindle extending through the casing into the supply-spool chamber and engaging the ratchet-wheel, substantially as described.

6. In a photographic-roll holder, the combination with the casing having the opening, the removable frame having the film-support and spool-chambers in rear thereof, the hinged plates at the ends of the chambers, the detent-wheel on one plate having the projection for engaging a spool, and a movable detent for coöperating therewith, a ratchet-wheel on the other plate, a pawl coöperating therewith, a spool-engaging projection on said ratchet-wheel, and a removable spindle passing through a spool-chamber and engaging the ratchet-wheel, substantially as described.

7. The combination with the casing having the opening and the pivoted spool-detent mounted therein capable of operation from the exterior of the casing, of the removable frame having the spool-chambers, the hinged plate at the end of the winding-spool chamber, the ratchet-wheel and pawl mounted thereon, the removable spindle passing through the casing and engaging the ratchet-wheel, the hinged plate at the end of the supply-spool chamber, the rotatable detent-wheel thereon having the spool-engaging stud, and the spool-engaging stud on the opposite end of said chamber, substantially as described.

8. The combination with the casing having the front opening, the removable frame having the film-support provided with the aperture, the spool-chambers at opposite ends of the rear side of the support, and spool centering and holding devices therein, of the movable locking-plate on the frame having the projecting end engaging the casing, and the perforated ears, and the pins on the casing with which said ears coöperate, substantially as described.

9. A photographic-roll holder consisting of a casing having an opening in the front and a removable slide for covering the same, a film-support in rear of said opening having a sight-aperture therein, and spool-centering devices located within the casing in rear of the film-support.

10. A photographic-roll holder consisting of a casing having a front opening, a removable door for the opening, a film-support in rear of said opening having a sight-aperture arranged centrally thereof, and spool centering and winding devices in the casing and in rear of the film-support.

11. A photographic-roll holder embodying a casing open at front and rear, a removable slide for covering the front opening and a roll-carrier in the casing, embodying a back board for covering the rear, having secured thereto a film-support lying in rear of and in close proximity to the front opening in the casing and having a sight-aperture therein, and spool winding and centering devices secured to the carrier and in rear of the film-support.

12. In a photographic-roll holder, the combination with an outer casing open at the rear and having a slide for opening and closing the front, a roll-carrier fitting in the open rear portion and consisting of a front board having an observation-aperture, a rear board and top and bottom walls connecting the front and rear boards, a supply-roll and a take-up spool mounted in the top and bottom walls on opposite sides and an observation-tube leading from the rear board to the observation-aperture in the front board.

13. In a photographic-roll holder, the combination with an outer casing open at the rear and having a removable slide for closing the front, a roll-carrier fitting in the rear portion of the casing embodying the top and bottom supports, a front board or film-support arranged in rear of the front opening in the casing having a sight-aperture therein, spool-centering devices on the top and bottom supports and in rear of the front board, and a rear board having a sight-aperture therein registering with the aperture in the front board and means extending from the front to the rear board for excluding the light from the spools.

14. In a holder for cartridge-rolls of film, the combination with a film-support over which the film passes, having a sight-aperture therein, of spool centering and operating devices located in rear of said support and on opposite sides of the sight-aperture therein, whereby markings of the back of the material passing from spool to spool over the support are visible from the rear of the support.

GEORGE EASTMAN.

Witnesses:
ALICE K. WHITNEY,
HENRY A. STRONG.